United States Patent
Hupf et al.

[11] Patent Number: 6,080,496
[45] Date of Patent: Jun. 27, 2000

[54] METHOD FOR A COATING COOKING VESSEL

[75] Inventors: Charles J. Hupf, Cascade; Daryl E. Crawmer, Appleton; Leonard C. Brumbaugh, Neenah, all of Wis.

[73] Assignee: Regal Ware, Inc., Kewaskum, Wis.

[21] Appl. No.: 09/091,200

[22] PCT Filed: Dec. 24, 1996

[86] PCT No.: PCT/US96/20771

§ 371 Date: Jun. 10, 1998

§ 102(e) Date: Jun. 10, 1998

[87] PCT Pub. No.: WO97/24469

PCT Pub. Date: Jul. 10, 1997

Related U.S. Application Data

[60] Provisional application No. 60/010,341, Dec. 29, 1995.

[51] Int. Cl.$^7$ .............................. A47J 27/00; C23C 4/04; C23C 4/16
[52] U.S. Cl. .......................... 428/626; 428/544; 428/651; 428/684; 428/686; 428/35.8; 428/35.9; 427/447; 427/449; 427/453; 427/454; 427/455; 427/456; 220/912
[58] Field of Search ..................... 427/447, 449, 427/453, 454, 455, 456; 220/912; 428/544, 626, 651, 684, 686, 35.8, 35.9

*Primary Examiner*—Katherine A. Bareford
*Attorney, Agent, or Firm*—Ryan Kromholz & Manion, S.C.

[57] ABSTRACT

A method for preparing and coating metal cookware having an interior cooking surface and for the application of a lubricative coating is disclosed. The method includes mechanically spraying the interior cooking surface with an aluminum oxide material to produce a roughened surface and applying by thermal spraying a metallic abrasion resistant layer of substantially pure titanium, titanium oxide and/or titanium nitride. Also disclosed is a cooking utensil having a substrate and an intermediate layer deposited on the substrate by thermally spraying the substrate with a mechanically durable material, said mechanically durable material being selected from the group consisting of chemically pure titanium, titanium-aluminum, nickel-titanium, and titanium 6-4.

7 Claims, 3 Drawing Sheets

METHOD FOR A COATING COOKING VESSEL

This case is a national stage application of PCT/US96/20771, filed Dec. 24, 1996. This application claims benefit of provisional application application 60/010,341 Dec. 29, 1995.

BACKGROUND OF THE INVENTION

The present invention relates generally to the field of thermally sprayed coatings applied onto the interior surface of cooking vessels and specifically to the use of thermally sprayed means of electric arc spraying or flame spraying methods to apply a layer of material onto the interior surface of a cooking vessel. This is done to improve the characteristics of the interior surface of the cooking vessel. It is typically done to prepare the cooking surface of the cooking vessel for receiving a non-stick or lubricative coating layer.

The present invention specifically relates to a method for coating a substrate with a very hard surface having a non-stick coating and a resulting cooking utensil. Additionally, the hard surface applied as disclosed herein is substantially chemically inactive where it is applied.

Application of non-stick coatings to cooking vessels is well-known. Adhesion of non-stick coatings (for example non-stock coatings such as the TEFLON brand non-stick coating), which are applied to a substrate metal, is improved by first flame spraying metal droplets onto the substrate layer to give a rough surface for the non-stick coating to adhere to. However, this coating typically must be thin. This is because that, while a thick coating of the non-stick material will increase the non-stickability of the interior surface of the cooking vessel, a thick coating will reduce the scratch resistance of the interior surface of the cooking vessel. Thus, a relatively thin coating is desired to achieve maximum scratch resistance. Accordingly, there is a competition between thin and thick coatings. Thin coatings of non-stick material are desired to enhance durability, while thick coatings are desired to enhance the non-stick ability of the cooking utensil. Since many of the utensils used in cooking are made of metal and are substantially harder than the non-stick coating it is generally desirable to have a non-stick coating which is durable enough to withstand the abrasion of cooking utensils while retaining good non-stick characteristics.

Typically, the way to take advantage of the positive characteristics of both thick and thin coatings is to apply the droplets which form the rough surface of the substrate layer in a manner which presents peaks and valleys. The peaks being the tops of the metal droplets and the valleys being the spaces located therebetween. In this manner a thick layer of non-stick or lubricative material fills the valleys while a thin layer covers the tops of the peaks. Because the peaks are very close together, relative to the size of the cooking utensil used (e.g. a spatula, a fork, a knife, etc.), the cooking utensil glides on the tops of the peaks. Accordingly, because the layer of material is very thin at the top of the peaks, the hardness of metal material used to form the roughened surface enhances the scratch or scuff resistance of the non-stick coating. Consequently, because enhanced scratch resistance is desired, the metal used to form the peaks must be substantially hard so that it can resist the abrasion of the cooking utensil. Thus, a hard metal, typically stainless steel, is chosen as the metal that is to be flame sprayed onto the substrate to form the roughened intermediate layer surface.

However, an additional problem is that the non-stick coating can suffer breakdown due to corrosion between the substrate metal of the cooking vessel and the thermally sprayed intermediate layer (galvanic corrosion) or as the result of cooking high acid content food (e.g., stewed tomatoes) at relatively high cooking temperatures (electrolytic corrosion). Accordingly, metals that are subject to corrosion in combination with a thermally sprayed intermediate layer are not considered suitable. Unfortunately, it is very difficult to prevent the aforementioned type of corrosion from occurring because the metal applied by flame spraying or similar technique is almost always different from the metal which forms the substrate. Even when similar metals are used there may be corrosion because foundry grade metals., e.g. 443-1 aluminum alloy, are not the pure metal but contain other metals or impurities. Two pure metals could be used but the cost of each piece produced by such a process would be commercially substantial.

It is the objective of the present invention to produce a cooking vessel having an intermediate layer which is substantially hard and substantially chemically inactive when applied to the substrate layer of a cooking vessel so that the resulting cooking vessel when coated with a non-stick or lubricative material will have enhanced scratch resistance and be substantially resistant to, if not impervious to, galvanic and electrolytic corrosion.

The present invention is believed to be most suitably used with aluminum cookware but it will also work with stainless steel cookware. The present invention produces cookware having increased durability and improved resistance to corrosion. Consequently, the layer of material produced by the present invention is able to withstand the scraping of cooking utensils and to avoid the blistering caused by corrosion which can occur under the non-stick surface due to the chemical interaction between the intermediate or mechanically durable layer and base layer of the cooking vessel.

The present invention is thus a unique and simple method, and a product produced by that method, for application of a thermally sprayed layer onto a substrate of a cooking vessel for formation of a layer having improved durability as well as improved resistance to corrosion. The inventors know of no prior art which either teaches or discloses the present invention. As noted above, the inventors believe that the present invention is best used with aluminum pans but it may be used with any substrate that could be used to make a cooking vessel.

SUMMARY OF THE INVENTION

The invention is a method for coating a surface of a cooking vessel by mechanically forming a roughened layer on the surface of the cooking vessel. This is followed by using a starting material to form a metallic abrasion resistant layer onto said roughened layer where the resulting metallic abrasion resistant layer is substantially titanium nitride, titanium oxide, and/or titanium. The resulting layer being substantially chemically inactivate, at least, with respect to galvanic and electrolytic corrosion.

Alternatively, the present invention may be described as a method for coating metal cookware having an interior cooking surface and preparing that interior surface for the application of a lubricative coating (e.g. TEFLON brand non-stick coating). This method comprises mechanically roughening the interior cooking surface with an aluminum oxide material to produce a roughened surface and then applying to the roughened surface, by thermal spraying, a metallic abrasion resistant layer comprising at least one of or a mixture including titanium nitride, titanium oxide, or pure titanium.

Additionally, the resultant layer or material may be described as a substantially chemically inert material comprising at least one of the group of materials consisting of titanium nitride, titanium oxide, or chemically pure titanium. The above noted method may be accomplished, in part, by thermally spraying the material used to form the metallic abrasion resistant layer onto the surface of the cooking vessel using a compressed gas mechanism containing a compressed gas. The preferred compressed gas may be nitrogen but air may also be used or any other compressed gas suitable for producing the surface desired.

If air is used some of the titanium will form titanium nitride. Some will remain titanium and some will be titanium oxide. Accordingly, the present method may be modified so that the substantially pure titanium material is combined with the nitrogen during the thermal spraying so that metallic abrasion resistant layer produced is substantially a titanium nitride with small amounts of titanium, and titanium oxide.

Alternatively the method of the present invention may be summarized as a method for preparing a surface for application of a non-stick coating by thermally spraying the surface with a metal or metal alloy selected from the group consisting of chemically pure titanium, titanium-aluminum, nickel-titanium, and titanium 6-4 to form a metallic abrasion resistant coating on the desired surface.

In this method the metallic abrasion resistant coating may be thermally sprayed onto the surface of the cooking vessel by melting or vaporizing a wire and then propelling the material by use of a compressed gas mechanism onto said surface of said cooking vessel. The wire may comprise a base of chemically pure titanium; it should be noted that chemically pure titanium may contain other materials and there may be various grades of titanium which can be considered chemically pure. In the present invention an analysis of the type of chemically pure titanium used also showed it to include 0.007% silicon, less than 0.01% magnesium, 0.017% carbon, 0.015% chromium, 0.03% nickel, less than 0.01% copper, less than 0.001% vanadium, 0.08% iron, 0.08% aluminum, 0.007% nitrogen, 0.00455% hydrogen, and 0.059% oxygen. Additionally, as previously noted other materials like titanium-aluminum, nickel-titanium, and titanium 6-4 may be used in conjunction with or in place of the chemically pure titanium. The surface of the cooking vessel is preferably aluminum or stainless steel.

Finally, the product of the method disclosed herein may be described as a cooking utensil comprising a substrate and an intermediate layer deposited on the substrate by thermally spraying the substrate with a mechanically durable material. The mechanically durable material being selected from the group consisting of chemically pure titanium and titanium-aluminum as previously noted. [If titanium-aluminum wire is used, some alumanides may also be formed which will increase the overall hardness of the deposited material.] The mechanically durable material producing a resulting abrasion resistant material which comprises the intermediate layer. The resulting abrasion resistant material produced being at least one of the materials selected from the group including at least one of titanium, titanium nitride, and titanium oxide.

Accordingly, the above noted method may be accomplished in part by thermally spraying the material which forms the metallic abrasion resistant layer onto the surface of the cooking vessel using a compressed gas mechanism containing a compressed gas. The compressed gas used typically is nitrogen. In a pure nitrogen environment the metallic abrasion resistant surface produced is hypothesized to be composed of titanium nitride and some pure titanium; if chemically pure titanium wire is used. If air is used and chemically pure titanium is used then the hypothesis is that some of the titanium will form titanium nitride since nitrogen is the largest component of air, some will form titanium oxide since that is the next largest component of air, some may combine with other components of the air to form other materials, and some will simply remain titanium.

DEFINITIONS OF TERMS

For the purpose of clarity the terms given below shall be interpreted throughout the specification and the claims as having the following definitions. Should there be any contradiction between the meaning given a term herein and its common meaning, that term shall be interpreted as having both meanings without detriment to the scope of or the validity of the claims made herein.

Thermal spraying—any method of applying the material disclosed in claims herein to a surface by causing: 1. The material to melt in an electric arc and then blowing the melted material onto the desired surface. 2. The material to be reduced to a molten state in a flame and blown onto a desired surface by a compressed gas. Further, for the purpose of this disclosure, thermal spraying as used herein and shall also include the meaning of the terms flame spraying and arc spraying.

The term "melt" when used in association with thermal spraying herein shall be interpreted to also alternatively include the words "vaporize" and "boil" and these meanings of the words.

The purpose of this definition section is to provide notice to the Patent Examiner that the defined terms are to be given broad definition and interpretation.

DETAILED DESCRIPTION

Although the disclosure hereafter is detailed and exact to enable those skilled in the art to practice the invention, the physical embodiments hereafter disclosed merely exemplify the invention which may be embodied in other specific structure. While the preferred embodiment is described, the details may be changed without departing from the invention, which is defined by the claims which follow.

A pan is provided. The pan may be made of cast aluminum, drawn aluminum, or stainless steel. The pan material specifically used in conjunction with the invention used herein is 443-1 aluminum alloy.

Figure 1:
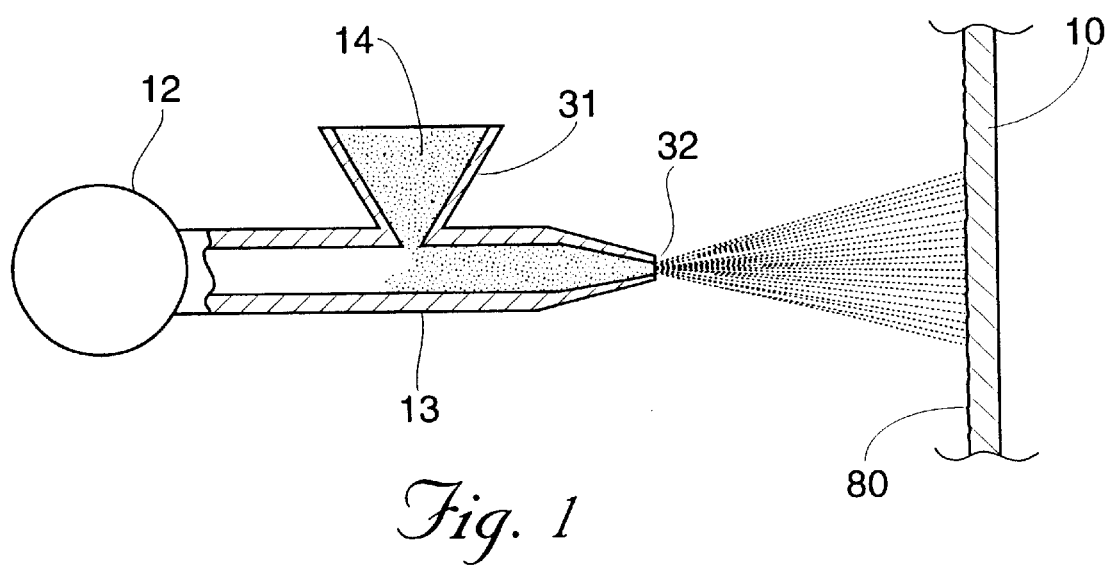
FIG. 1 shows a powdered aluminum oxide being sprayed onto a cooking surface of a metal pan to mechanically roughen and clean the cooking surface of the cooking vessel.

The pan has an inner wall 10. The inner wall 10 defines a food receiving space for receiving food to be cooked and has a cooking surface. Referring to FIG. 1, powdered aluminum oxide 14 is placed in a funnel 31 which is connected to a nozzle 13. The nozzle 13 is connected to a known device 12 containing compressed gas therein. The compressed gas is nitrogen, however, compressed air may be used. The pressure of the compressed gas is approximately 5-8 kilograms per square centimeter. The pan is placed a proper distance from the nozzle exit 32 of the nozzle 13. The powdered aluminum oxide 14 is propelled through the nozzle 13 by the compressed gas onto the inner wall 10 of the pan in order to roughen and clean the cooking surface. The roughened and cleaned cooking surface layer 80 of the inner wall 10 is produced from this spraying. The cooking surface 80 of the inner wall 10 is roughened and cleaned so as to facilitate the attachment and bonding of a further coating thereon.

Figure 2:
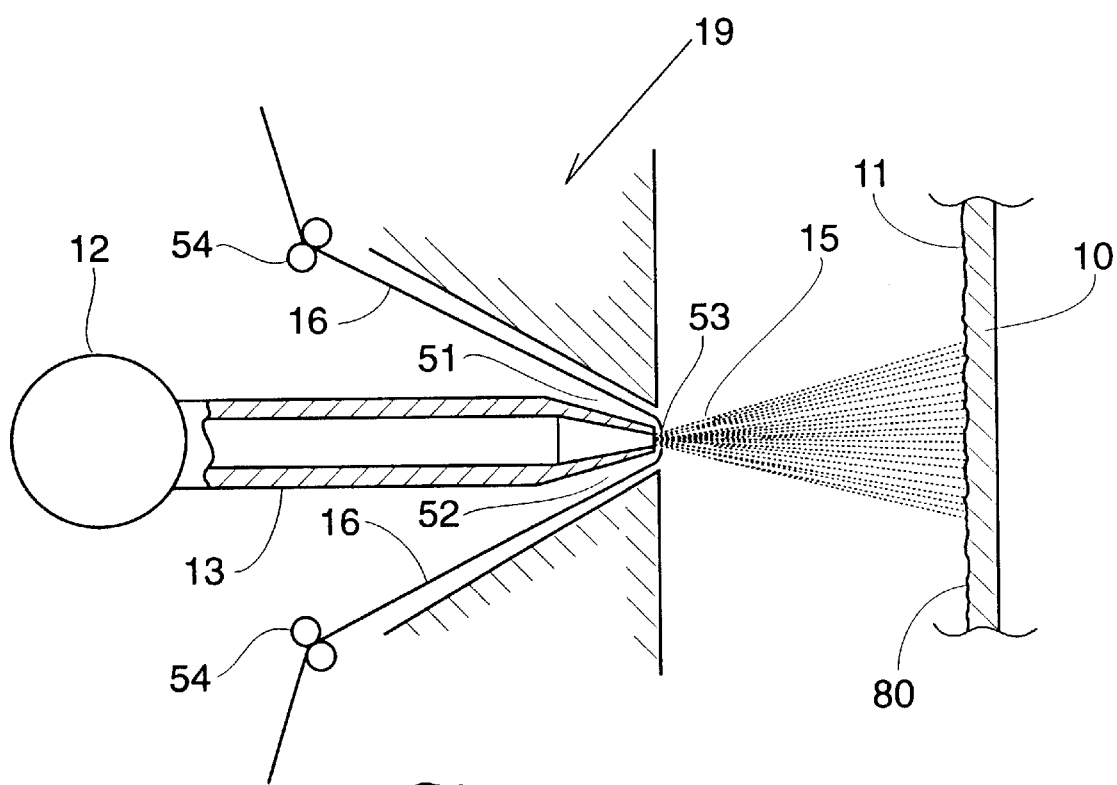
FIG. 2 shows a mechanically resistant layer being applied to the roughened and cleaned cooking surface of the metal pan in FIG. 1.

FIG. 2 shows that a mechanically resistant layer 11 of the present invention is applied to the roughened and cleaned cooking surface 80 of the inner wall 10 by electric arc spraying using electric arc spraying mechanism 19. The mechanically resistant layer 11 may or may not be continuous. It depends if sufficient material is sprayed so that all the droplets are contiguous. Presently, the mechanically resistant layer 11 produced is not continuous. The mechanically resistant layer 11 can be made from a metallic material which is preferably chemically pure titanium but which may be selected from the group consisting of chemically pure titanium, titanium-aluminum, nickel-titanium, and/or titanium 6-4. An electric arc area 15 is located adjacent to the nozzle 13. Area 15 is at a temperature of approximately 3,000° C. to 3500° C. (5400° F. to 6400° F.). The compressed gas is at a pressure of 5–8 kilograms per square centimeter. The electric arc mechanism 19 uses a voltage of 30–40 volts in a direct current of 80–300 amps to produce an electric arc in the electric arc area 15. Two metal wires 16 of opposite polarity are respectively fed by means of two roller devices 54 into the electric arc area 15 along two passages 51 and 52 toward an opening 53. The inner wall 10 is located from the opening at a distance of about 20–50 centimeters. The metal wires 16 are melted (vaporized, boiled) by means of an electric arc at area 15 and are propelled by the compressed gas from the device 12 so as to be sprayed onto the roughened and cleaned cooking surface 80 of the inner wall 10 thus forming the mechanically resistant layer 11.

Figure 3:
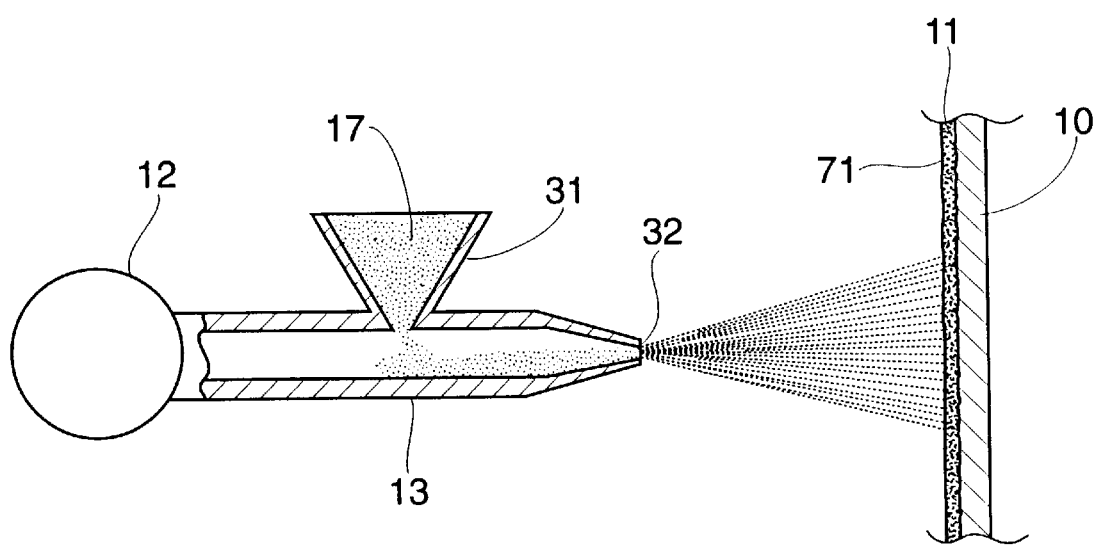
FIG. 3 shows a coating of a lubricative layer or a non-stick layer being applied over the mechanically resistant layer in FIG. 2.

A lubricative or non-stick layer 71 is then applied. FIG. 3 shows a non-stick or lubricative layer being applied over the mechanically resistant layer 11 by a known spray coating technique. The lubricative layer 71 is typically a non-stick coating such as TEFLON brand non-stick coating and is applied in the known manner.

As may be seen in FIG. 3, the composition 17 of the non-stick coating 71 is received via the funnel 31 and is propelled by the compressed gas of the device 12 through the nozzle 13 to spray onto the mechanically resistant layer 11 already on the cooking surface of the inner wall 10.

Figure 4:
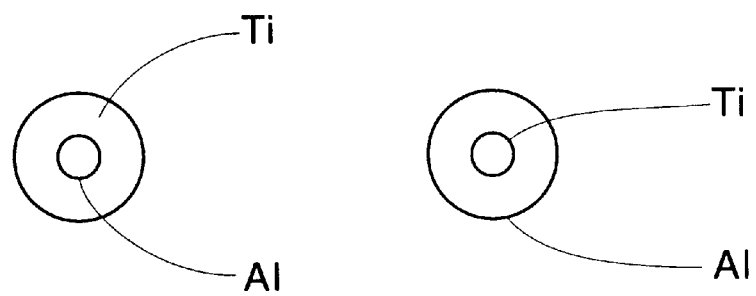
FIG. 4 shows a cross sectional view of two pieces of wire. One piece of wire having a titanium core and an aluminum surface and the other wire having an aluminum core and a titanium surface.

Referring to FIG. 4, the wires 16 could be combination of metals like titanium and aluminum, as shown, in addition to pure titanium or the other materials previously noted. The wires shown in FIG. 4 illustrate two types of wire which may be used in the present invention. Alternatively, a wire of pure titanium and a wire of other material, like aluminum, could simultaneously be fed into the thermal spraying mechanism 19 and thus practice the invention disclosed herein. However, this would require that the thermal spraying mechanism 19 be modified so that the two wires 16, composing the two different materials, could be fed into the thermal spraying mechanism 19 at different rates of speed since the titanium wire and the other wire, e.g., an aluminum wire, would be consumed at different rates.

Figure 5:
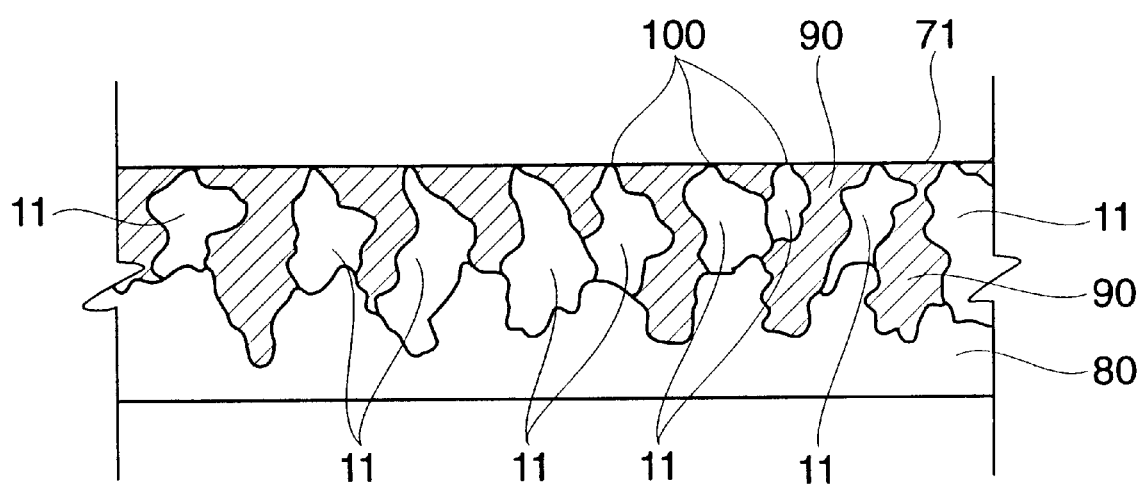
FIG. 5 shows a cut-away side view of the various layers which have been applied or formed on the surface of the cooking vessel.

Referring to FIG. 5, the unique combination of non-stick compound, titanium, titanium oxide, titanium nitride, and aluminum oxide roughened base on the aluminum pan may be illustrated. As can be seen from FIG. 5, the thermal spraying of the titanium causes the titanium to anchor itself to the aluminum oxide roughened base and prevent the non-stick coating compound form being worn away over time by presenting a series of peaks 100 (throughout) and valleys 90. The non-stock coating 71 collects in the valleys 90. The titanium material compounds form the peaks 100. The peaks 100 are thus substantially close to one another and therefore metal utensils used in cooking vessels contact the peaks of the titanium and/or titanium compounds and glide (on the peaks) without having substantial contact with the non-stick coating 71 located in the valleys 90 between the peaks 100. Accordingly, the present invention produces a structure which allows for a thick coating of non-stick material 71 to be present in the valleys 90 between the peaks 100 of the titanium and titanium compounds and a then coating of non-stick material 71 over the peaks of the titanium and titanium compounds. Thus the benefits of a thin layer and a thick layer of non-stick material are achieved at the same time taking advantage of the hardness of titanium based materials.

It should be noted that the intermediate layer applied by the method of the present invention is not necessarily a contiguous or integral layer but simply may consist of a pattern of droplets or particles thermally sprayed on the desired cooking utensil surface.

It should further be noted that the present invention, while specifically disclosing a wire made of a titanium material could also be performed using powdered metal as well, e.g., in a flame spraying technique. The new method is for use in thermal spraying of titanium materials onto a cooking vessel substrate surface. Preferably, this thermally sprayed material will prepare the cooking vessel substrate surface for the application of a non-stick coating 71 and result in a cooking vessel having an improved durability on its cooking surface as well as reduce galvanic corrosion characteristics when used in combination with aluminum or stainless steel. It should be emphasized, however, that the improved durability will occur by the application of the present method to cooking vessels made from other materials but it is the belief of the inventors that the least amount of galvanic corrosion or electrolytic corrosion will occur in cooking vessels comprised of aluminum or stainless steel materials.

The above described embodiments of this invention are merely descriptive of its principles and are not to be limited.

What is claimed is:

1. A cooking vessel comprising:
   a roughened substrate surface area, an intermediate layer and an outer, nonstick layer, said intermediate layer formed by arc spraying a metallic material selected from the group consisting of chemically pure titanium, titanium aluminum, nickel-titanium, and titanium 6-4 on said roughened substrate surface area to form a mechanically durable material defining peeks and valleys therein, wherein in the arc spraying process, compressed air is used to blow the material to the roughened substrate surface area, said mechanically durable material including pure titanium, titanium nitride, and titanium oxide, said outer, non-stick layer including an exposed surface and an underlying surface area, said underlying surface area being configured to conform to said defined peaks and valleys of said intermediate layer.

2. A method for coating a surface of a cooking vessel, the method comprising:

forming a roughened layer by abrading the surface with a roughening material;

applying, by thermal spraying, a metallic abrasion resistant layer over said roughened layer, wherein in the thermal spraying process, compressed air is used to blow melted material to the roughened layer;

the metallic abrasion resistant layer substantially comprising titanium nitride, titanium oxide, and pure titanium.

3. A method of coating metal cookware having an interior cooking surface, the method comprising mechanically roughening the interior cooking surface with a roughening material to produce a roughened surface;

selecting a starting material from a group of materials consisting of substantially pure titanium, titanium-aluminum, nickel-titanium, and titanium 6-4;

arc spraying said starting material upon said roughened surface to provide an intermediate layer defining peaks and valleys within said intermediate layer, wherein compressed air is used to blow the starting material upon the roughened surface in the arc spraying process; and depositing upon said intermediate layer an outer, non-stick layer including an exposed surface and an underlying surface area configured to conform to said defined peaks and valleys of said intermediate layer.

4. The method of claim 3 in which the starting material is arc sprayed onto the surface of the cooking vessel using a compressed gas mechanism containing compressed air.

5. A method of preparing a surface of a cooking vessel for application of a non-stick coating; the method comprising blasting said surface with aluminum oxide, and then thermally spraying the surface with at least one material selected from the group consisting of chemically pure titanium, titanium-aluminum, nickel-titanium, and titanium 6-4 to produce a metallic abrasion resistant coating, wherein in the thermal spraying process, compressed air is used to blow the material to the surface.

6. The method of claim 5 in which said surface of said cooking vessel is comprised of aluminum.

7. The method of claim 5 in which said surface of said cooking vessel is comprised of stainless steel.

* * * * *

UNITED STATES PATENT AND TRADEMARK OFFICE
CERTIFICATE OF CORRECTION

PATENT NO. : 6,080,496
DATED : 27 June 2000
INVENTOR(S) : Charles J. Hupf, Daryl E. Crawmer, Leonard C. Brumbaugh It is certified that error appears in the above-identified patent and that said Letters Patent is hereby corrected as shown below:

Title page, item [54]

Delete all reference to the title "Method for a Coating Cooking Vessel" and substitute therefore -- Method for Coating a Cooking Vessel --.

Signed and Sealed this

First Day of May, 2001

Attest:

NICHOLAS P. GODICI

*Attesting Officer*   *Acting Director of the United States Patent and Trademark Office*